United States Patent [19]

Brown

[11] Patent Number: 4,960,324
[45] Date of Patent: Oct. 2, 1990

[54] ELECTROCHROMIC, OXYGEN DEFICIENT METAL OXIDE FILMS PROVIDED BY PYROLYTIC DEPOSITION

[75] Inventor: Franklin I. Brown, Southfield, Mich.

[73] Assignee: Ford Motor Company, Dearborn, Mich.

[21] Appl. No.: 253,656

[22] Filed: Oct. 5, 1988

[51] Int. Cl.$^5$ ............................................. G02F 1/01
[52] U.S. Cl. .................................................. 350/357
[58] Field of Search ..................................... 350/357

[56] References Cited

U.S. PATENT DOCUMENTS

| | | | |
|---|---|---|---|
| 4,175,837 | 11/1979 | Yano et al. | 350/357 |
| 4,233,339 | 11/1980 | Leibowitz et al. | 427/108 |
| 4,805,996 | 2/1989 | Carlson | 350/357 |
| 4,889,414 | 12/1989 | Rauh et al. | 350/355 |

FOREIGN PATENT DOCUMENTS

| | | | |
|---|---|---|---|
| 2710772 | 9/1977 | Fed. Rep. of Germany | 350/357 |
| 0209721 | 12/1983 | Japan | 350/357 |
| 0051820 | 3/1985 | Japan | 350/357 |
| 2204236 | 9/1987 | Japan | 350/357 |

OTHER PUBLICATIONS

Siefert, "Properties of Thin $In_2O_3$ and $SnO_2$ Films ...", *Thin solid Films*, Oct. 1984, pp. 275-282.

Primary Examiner—Eugene R. LaRoche
Assistant Examiner—Michael B. Shingleton
Attorney, Agent, or Firm—Lorraine S. Melotik; Roger L. May

[57] ABSTRACT

This invention is directed to electrochromic devices wherein a layer of cathodic electrochromic material comprising non-stoichiometric, oxygen deficient metal oxides is provided by pyrolytic deposition techniques. The pyrolytic deposition is of a compound comprising a powdered metal compound and a reducing agent or a liquid composition and a reducing agent. The pyrolytic deposition can also be accomplished by a powdered composition or a liquid composition dispersed in a carrier gas.

30 Claims, 1 Drawing Sheet

PRIOR ART

ELECTROCHROMIC, OXYGEN DEFICIENT METAL OXIDE FILMS PROVIDED BY PYROLYTIC DEPOSITION

BACKGROUND OF THE INVENTION

1. Field of the Invention

The present invention relates to electrochromic devices which exhibit coloration and bleaching thereof at ambient temperature by control of the polarity of an induced electric field. More particularly, this invention relates to electrochromic devices wherein a layer of cathodic electrochromic material comprising non-stoichiometric, oxygen deficient metal oxide is provided by pyrolytic deposition techniques.

2. Discussion of the Related Art

Electrochromic devices are devices in which a Physical/chemical change produced in response to the induced electric field results in a change in the reflective (or transmissive properties) of the device with respect to electromagnetic radiations, e.g., UV, IR, and visible radiation. Such devices, one embodiment being shown as item 10 in FIG. 1, generally comprise a film of electrochromic material 12 and an ion-conductive insulating layer 14 which functions as an electrolyte layer. The film and the electrolyte layer are in surface contact with each other for exchange of ions between the electrochromic film and the electrolyte layer. Two conductive electrode layers, 16 and 18 in FIG. 1, at least one of them being transparent, are disposed on the opposite outer surfaces of the film and the electrolyte layer to provide means for applying a voltage across the combined thickness of the electrochromic film and the electrolyte layer. The electrode layers, 16 and 18 in FIG. 1, are provided on substrates, 20 and 22 of FIG. 1, which substrates may be of a material such as glass. The combination described is provided with external electrical means for applying a voltage to the electrodes to cause coloration of the electrochromic layer. By reversing the polarity of the applied voltage, the colored electrochromic layer will be uncolored (bleached). Changing from the bleached state to the colored state or from the colored state to the bleached is termed "switching". The electrochromic material may be persistent in either its colored state or its non-colored state. By "persistent" is meant the ability of the material to remain, after removal of the electric field, in the absorptive state to which it is changed, as distinguished from a substantially instantaneous reversion to the initial state. The length of time a material is persistent is called its "memory". Electrochromic devices of this type have been described for several uses, such as image display, for light filtering, etc.

In such devices, the electrochromic film usually comprises an inorganic metal oxide material, most commonly a transition metal oxide, in particular: tungsten oxide. The electrochromic metal oxide layer has been applied by a number of techniques: vacuum deposition, chemical vapor deposition, thermal evaporation, sputtering, and electron beam evaporation. See, e.g., U.S. Pat. Nos. 4,194,812; 4,278,329; 4,645,308; 4,436,769; 4,500,878; 4,150,879; 4,652,090; 4,505,021; and 4,664,934. When tungsten oxide is the electrochromic material, the electrolyte layer is adapted to provide a positively charged ion, preferably, a proton or a lithium ion. The electrolyte layer is generally a liquid electrolyte solution which comprises polymers or copolymers containing acidic groups such as polystyrene sulfonic acid or a compound like lithium chloride. The electrolyte layer also may be a gel or a solid material.

One of the problems with the prior art devices of this type is that the electrochromic layers of such devices are not provided by methods which are suitable for coating large areas such as would be necessary if, e.g., sunroofs or windshields of automobiles were to be made as electrochromic devices. As would be apparent, it would be advantageous to make such items electrochromic devices which could be colored to a desired intensity to keep out radiation like UV, IR and visible transmissions at will. For example, it might be desirable to "color" the sunroof and the windows to allow minimum transmittance when the automobile is parked to prevent the interior of the automobile from heating up on a sunny day In another embodiment, the windshield might be colored to an intensity which allows operation of the automobile yet reduces the amount of visible transmission through the windshield.

Present methods for providing the electrochromic layer also are generally incapable of providing an electrochromic layer having sufficiently low transmission of electromagnetic radiation. It is important to provide a device capable of low transmission, particularly of IR radiation, if the device is to be used as the sunroof or windshield of an automobile. Another problem encountered with prior art electrochromic devices is that they lose their ability to switch with time, i.e., after numerous switches the percent of electromagnetic radiation that is transmitted by the electrochromic material in its colored state increases. This is particularly problematic if the device is to be used through many cycles to keep out undesirable radiation, as would be intended by a sunroof or windshield of an automotive vehicle or windows of a building. Still another problem of such devices is that the electrochromic material, if it is coupled with a liquid electrolyte layer, has a tendency to be solvated by the liquid electrolyte layer. This reduces the durability of the device as well as the number of switches through which it can suitably function.

An attempt to improve the resistance of electrochromic material to the degrading effects of the electrolyte is taught is U.S. Pat. No. 4,233,339 to Leibowitz et al. It is disclosed therein that by subjecting thin, electrochromic layers deposited on substrate electrodes to a special heat treatment at a selected high temperature for a selected short time, at least a free portion of each layer is converted from the amorphous to the crystalline form. It is further taught that this outer layer of the electrochromic material significantly increases the resistance of the electrochromic layer to degradation by the liquid electrolyte. In U.S. Pat. No. 4,175,837, to Yano et al, it is disclosed that solvation of a tungsten oxide film can be decreased by forming a $WO_3$ film on a glass substrate under conditions where the substrate is held at a high temperature, that is, between 250° C–450° C. According to that patent, the $WO_3$ film is deposited by thermal evaporation and vacuum deposition. It taught that the transparency of the $WO_3$ film is undesirably lessened, however, when the substrate is held above 450° C. during the formation of the $WO_3$ film.

It would be desirable if a method could be found to form a durable electrochromic device capable of substantially reducing transmission of electromagnetic radiation, wherein the device is capable of switching for prolonged periods of time without substantially any loss of such electrochromic activity, and wherein the electrochromic layer provided on a surface (i.e., on an electrode) would be resistant to dissolution by the electrolyte. It would be most advantageous if a method for providing such an electrochromic layer would be simple and commercially suitable for coating large areas easily.

The invention disclosed herein is capable of overcoming the aforementioned problems of prior art devices. The invention comprises providing the electrochromic layer by pyrolytic deposition techniques.

Pyrolytic deposition techniques comprises heating a surface and applying a composition at room temperature onto the heated surface. For the sake of convenience, the composition is generally sprayed onto the heated surface. The heat from the hot surface causes chemical degradation of the sprayed composition and subsequent recombination of components of the degraded material with the ambient gas to form a material on the surface. Various U.S. Patents describe the pyrolytic deposition of metal oxides onto glass to change its apparent color or reduce it transmission to electromagnetic radiation. See, e.g., U.S. Pat. Nos. 4,217,392; 4,349,369; and 3,374,156. None of these patents teaches or discloses an electrochromic device wherein the electrochromic layer comprises oxygen deficient metal oxide which has been deposited by pyrolytic deposition as in the present invention.

SUMMARY OF THE INVENTION

The present invention is directed to an electrochromic device comprising two substrates and therebetween: one electrode layer, a cathodic electrochromic layer, an ion conductive layer and another electrode layer in that order, wherein the cathodic electrochromic layer comprises a non-stoichiometric, oxygen deficient, variable oxidation state metal oxide. The ion conductive layer comprises an ion source means for providing ion into the electrochromic layer upon application of a voltage across the electrode layers. The electrochromic layer is deposited by pyrolytic deposition onto a surface selected from a surface of the ion conductive material and a surface of the electrode layer which surface is at a temperature between 500° F. and 1200° F. Preferably, the electrochromic layer is formed under the condition where the surface is at a temperature between about 700° F. and 1100° F, most preferably between 850° F. and 1100° F. In this device, at least one of the one electrode layer and the other electrode layer is transparent and each electrode layer is in contact with one of the substrates.

Advantageously, it has been found that preferred embodiments of the present invention device are capable of substantially preventing transmission of all electromagnetic radiation. Additionally, the method of the present invention appears to provide films of electrochromic material which are more durable than those applied by conventional deposition techniques. It has been found that embodiments of the present invention device switched for a substantially long period of time and during this switching maintained their ability to color to the same intensity level while switching. Additionally, embodiments of the electrochromic layer of the present invention device have been shown to be resistant to erosion (dissolution) in the presence of the ion conductive layer (electrolyte).

DETAILED DESCRIPTION OF THE PREFERRED EMBODIMENTS

Figure 1:
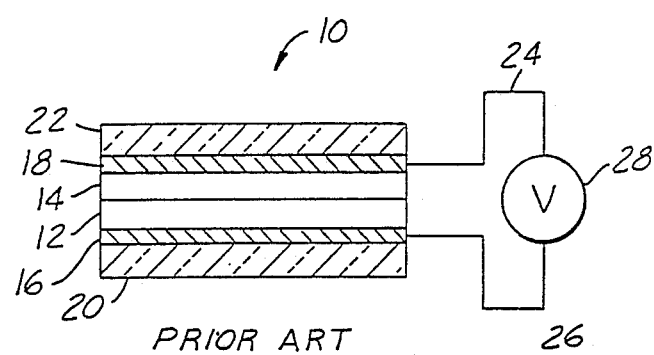
FIG. 1 discloses a schematic representation of one embodiment of an electrochromic device.

As discussed above, the electrochromic device of the present invention comprises two substrates and therebetween one electrode layer, a cathodic electrochromic layer, an ion conductive layer, and another electrode layer in that order. As is known to those skilled in the art, cathodic electrochromic materials switch to the colored state when a voltage of negative polarity is applied to the electrode adjacent the electrochromic layer. Devices of this general type are well known in the art and disclosed for example in the U.S. Patents listed above.

As disclosed above, we have found that by providing a non-stoichiometric, oxygen deficient metal oxide (as a cathodic electrochromic material) by Pyrolytic decomposition techniques, superior electrochromic devices are obtained. Formation of the cathodic electrochromic layer by this technique as well as each of the components of the electrochromic device will be discussed in detail hereinbelow.

Exemplary of non-stoichiometric, oxygen deficient metal oxides useful as the cathodic electrochromic material in this invention are those selected from the group comprising tungsten oxide, molybdenum oxide, vanadium oxide, titanium oxide and copper oxide, wherein each of these oxides the oxygen is less than stoichiometric.

Good cathodic electrochromic materials should be of the general formula: $MO_x$, where M is a variable valence metal and x is a number less than that which will provide a stoichiometric compound. That is, for good cathodic electrochromic materials the compound should be oxygen deficient, i.e., in a reduced state. Thus, as described in copending application U.S. Ser. No. 138,234 to Demiryont filed Dec. 28, 1987, $WO_x$, with x less than 3 is a good cathodic electrochromic material while $WO_3$ is not. (Presently $WO_3$ is understood to be electrochromic but of less than desirable electrochromic quality.) Similarly, as described in copending application U.S. Ser. No. 179,825 to Demiryont filed Apr. 11, 1988, $VO_x$ with x less than 2.5 is a good cathodic electrochromic material, while stoichiometric $V_2O_5$ is not an electrochromic material. Neither application discloses forming the electrochromic layer by pyrolytic decomposition techniques.

The metal oxide, in order to possess the desired electrochromic properties, is required according to this invention to be a non-stoichiometric metal oxide which is oxygen deficient. The degree to which the metal oxide is non-stoichiometric is dependent on the particular metal oxide employed as the electrochromic material. Optimal non-stoichiometry for each metal oxide useful as the electrochromic material will be apparent to one skilled in the art in view of the present disclosure. Still other metal oxides, or compatible mixtures of any of them, may be employed in the invention. Selection of such other metal oxide will be apparent to those skilled in the art in view of the present disclosure.

According to this invention, the electrochromic layer comprising a non-stoichiometric, oxygen deficient metal oxide is deposited on a surface by pyrolytic deposition under the condition where this surface is at a temperature between about 500° F. and about 1200° F., preferably between about 700° F. and about 1100° F., most preferably between about 850° F. and 1100° F. The surface is selected from a surface of the electrode layer and a surface of the ion conductive layer of the device. The non-stoichiometric, oxygen deficient metal oxide can be formed by pyrolytic deposition of a powder composition or a liquid composition which comprises compounds containing a metal having a variable oxidation state, which compounds are capable of decomposing when subjected to elevated temperatures and reacting with oxygen to form a non-stoichiometric metal oxide.

As disclosed above, the compositions employed in the deposition of the electrochromic layer can be in liquid or powder form. These compositions comprise inorganic substances which contain at least one metal element of a variable oxidation state, that is, at least one element of the Periodic Table of Elements which can exist in more than one oxidation state in addition to zero. These include materials containing a transition metal element (including Lanthanide and Actinide series elements) and materials containing non-alkali metal elements such as copper. Preferred materials of this class are transition metal compounds in which the transition metal may exist in any oxidation state from +2 to +8. Particularly useful metal compounds are those which contain as the metal: tungsten, molybdenum, vanadium, titanium, lead, bismuth, and copper. In the case of a liquid, the liquid composition comprises a dispersible or dissolvable metal compound. Exemplary of a liquid composition which can be employed to deposit, for example, a tungsten oxide film is one comprising tungsten hexachloride dissolved in solvents such as N,N-dimethylformamide, hydrofluoric acid and polar solvents including water. A copper oxide film can be deposited using a solution comprising, e.g., aqueous copper nitrate. A nickel oxide film can be deposited, e.g., from a solution comprising nickel acetate in ethyl alcohol/liquid ammonia. A molybdenum oxide film can be deposited, e.g., a solution comprising cyclopentadienyl molybdenum tricarbonyl dimer in methylene chloride.

Exemplary of powder compositions which may be employed according to the present invention to pyrolytically deposit the electrochromic layer include, for example, metal carbonyls, metal acetylaccetonates and titanium isopropylate, with the carbonyls being preferred. The composition applied by pyrolytic decomposition techniques according to this invention can also contain a mixture of different metal compounds wherein the metal or other portion of the compound is different, as would be apparent to one skilled in the art in view of the present disclosure.

As has been disclosed above, it is critically important in this invention that the cathodic electrochromic layer provided comprise a transition metal oxide which is non-stoichiometric and oxygen deficient. Deposition of a non-stoichiometric metal oxide may be encouraged by conditions such as: (1) including a reducing agent in the powdered composition or liquid composition, (2) providing a gas comprising inert gas or reducing gas as a carrier gas for the powdered composition or liquid composition, (3) providing, during the pyrolytic deposition of the electrochromic layer, a gas comprising an inert gas or reducing gas near the surface on which said electrochromic layer is being deposited, (4) controlling the temperature of the surface on which the electrochromic layer is being deposited and (5) controlling the rate of deposition of the composition, i.e., the amount of material/time being atomized by the deposition equipment. These conditions may be used, if desired, separately or in combination. Still other ways in which deposition of a non-stoichiometric metal oxide film may be provided will be apparent to those skilled in the art in view of this disclosure.

Exemplary of reducing agents that could be employed according to this invention include, for example, phenyl hydrazine, formaldehyde, alcohols and non-carbonaceous reducing agents such as hydroxylamine, and hydrogen. Reducing elements such as Au, F, Pb, etc. may also be included in the composition. Such reducing elements would codeposit with the electrochromic material and be incorporated with the cathodic electrochromic film. As disclosed above, another way to encourage formation of a non-stoichiometric metal oxide film is to Provide a reducing environment by means of the carrier gas or the gas near the surface on which the electrochromic layer is being deposited. The carrier gas employed according to this invention may, if it be desired to provide a reducing environment in this way, comprise a gas selected from any inert gas or reducing gas, including, but not limited to gases such as nitrogen, argon, carbon monoxide, carbon dioxide, and hydrogen and gas mixtures including air+nitrogen, air+nitrogen+argon, and the like. It is intended that, while a carrier gas, e.g., comprising an inert gas such a nitrogen, may be employed to provide a reducing environment, oxygen is still present near the surface on which the film is being deposited. The amount of oxygen near this surface may be decreased from that normally present, however, by employing a carrier gas (comprising an inert or reducing gas) or by providing a gas near the surface which will tend to displace some of the oxygen normally Present near this surface. The optimal amount of inert or reducing gas or reducing agent which could be employed according to this invention is that which would provide the desired non-stoichiometric, oxygen deficient transition metal oxide according to this invention. Selection of optimal amounts of such materials (e.g., inert gas and/or reducing agents) will be apparent to those skilled in the art in view of the present disclosure. It is also intended according to the invention disclosed herein, that the carrier gas may comprise or consist essentially of oxygen if a reducing environment is provided, e.g., by inclusion of a reducing agent in the deposition compositions of by modifying the temPerature of the support as described herein.

Deposition of a non-stoichiometric metal oxide film can be aided by controlling other parameters of deposition, such as temperature of the support as described above. For example, if the surface is maintained during deposition of the metal oxide layer thereon at very high temperatures such as 1150° F., formation of stoichiometric metal oxides are encouraged. Therefore, by depositing the metal oxide on a surface which is at a lower temperature, e.g., to about 900° F., formation of sub-stoichiometric metal oxides is encouraged.

While the electrochromic film may be pyrolytically deposited from liquid compositions and powder compositions comprising metal compounds, it is preferred according to certain embodiments that the electrochromic layer be deposited by pyrolytic deposition of a powder composition in order to obtain optimal reduction in solar transmission. Still further, it is preferred in such embodiments that the layer be deposited by employing a carrier gas, particularly, an inert gas like nitrogen for the powder composition.

The electrochromic layer is primarily if not substantially amorphous in nature, i.e., as compared to crystalline. This more porous, less compact amorphous form advantageously allows for the movement of ions throughout the electrochromic layer during switching. It has been found, that according to certain embodiments, the composition of the applied layer is dependent on the temperature of the surface. For example, it was found that at higher temperatures of 1080° F., when tungsten oxide is the applied electrochromic layer, it comprises a relatively thin layer of a stoichiometric tungsten oxide adjacent the surface and, thereon, a relatively thick layer of non-stoichiometric layer of the metal oxide. At a lower surface temperature during pyrolytic deposition, e.g., 900° F., the tungsten oxide film is found to be more uniformly non-stoichiometric. It is believed that the relatively thin layer of a stoichiometric tungsten oxide adjacent the surface in this fashion provides better adhesion of the layer to the surface. It has also been found according to certain embodiments, that a more oxygen-deficient film can be deposited when the deposition rate (i.e., the amount of material/time deposited) is increased.

Usually the thickness of the electrochromic film is between about 0.1 and 100 microns. However, since a small potential will provide an enormous field strength across very thin films, films of 0.1–10 microns thickness are preferred over thicker ones. Optimal thickness also will be determined by the material of the film. Generally, it would be provided onto one electrode of the electrochromic device. The electrochromic film may also be provided, however, on the ion conductive material as long as the ion conductive material is stable at the deposition temperatures and capable of accepting a pyrolytically deposited layer of the reduced metal oxide. As will be apparent to those skilled in the art, solid ion conductive materials, rather than liquid or gel materials, would be more suitably employed as a surface on which could be deposited the electrochromic layer according to this invention.

Electrochromic material applied according to the method of this invention exhibit fast switching time, long lifetime memory, high contrast between the colored and bleached states and excellent reduction of solar transmission, particularly when compared to electrochromic materials made by conventional deposition techniques. It has been found that embodiments of electrochromic films deposited according to this invention have good mechanical durability and durability in the presence of an acidic environment. It also been found that embodiments of films, e.g., $WO_x$ films deposited according to the method of this invention maintain their colored state typically for at least 4–6 weeks without an applied voltage. Embodiments of test devices employing $WO_x$ films deposited according to this invention which were cycled for a total of 81,000 cycles at room temperature showed no observable deterioration in electrochromic properties. A typical test device was fabricated comprising fluorine doped tin oxide. transparent electrodes, a $WO_x$ electrochromic film about 400 nm thick, and an electrolyte comprising a 1 molar mixture of lithium perchlorate in propylene carbonate.

The device measured approximately $2'' \times 1.5''$. A cyclic voltammogram was used to measure electrochromic reactions. The device was cycled at room temperature between $-2.5$ V and $+1.5$ V at a scan rate of 50 mv/sec. This corresponds to a 180 sec/cycle. The device colored deep blue (about 3% visible transmission) during the coloring cycle and bleached to a very light blue color during the bleaching cycle. From this and similar testing, it is believed that such a device could be cycled more than a million times and still maintain its electrochromic activity.

The electrodes used in the electrochromic device of this invention may be any material which, relative to the electrochromic film, is electrically conductive. At least one of the electrode-substrate combinations is transparent, although both may be. If it is intended that the electrode be a light transmitting electrode, there may be used a light transmitting film of an electrically conductive metal oxide such as doped or undoped tin oxide, indium oxide, zinc oxide and the like. The thickness of the transparent electrode layer generally falls within the range of 0.01 to several microns, correspondingly varying in transparency and resistance. The transparent electrode layer may be formed on the substrate by any known technique, including vacuum deposition, reactive deposition, ion plating, reactive ion plating or sputtering. The substrate employed in the device may comprise any material which is stable at the temperatures and under the conditions of the fabrication and use of the device. Commonly used materials for the substrates of such devices include, e.g., glass, quartz, etc. Selectional of the optimal material to be used for one or both substrates of the device will be apparent to one skilled in the art in view of this disclosure. The transparent electrode layer may be formed by the so-called thick film processes such as screen printing or coating. When the thick batch film process are used, (1) a paste containing metal compound micro particles or (2) a solution of an organic metal compound such as metal alcoholate or its oligomer is coated and sintered to form the transparent electrode layer. Preferably, the transparent electrode material is tin oxide doped with fluorine. The non-transparent electrode material selected from light-reflecting electrode materials (e.g., Al, Ag, Pt or Ni) or other electrode materials (e.g., Au, Pd, Cr, Ir, Ru, Rh or C). The electrodes may be in a continuous or grid pattern.

The ion conductive layer (often referred to as the electrolyte) can be selected from a number of materials. Exemplary of dielectric materials useful as the ion conductive layer are tantalum oxide ($Ta_2O_5$), niobium oxide ($Nb_2O_5$), zirconium oxide ($ZrO_2$), titanium oxide ($TiO_2$), hafnium oxide ($HfO_2$), alumina ($Al_2O_3$), yttrium oxide ($Y_2O_3$), lanthanum oxide ($La_2O_3$), silicon oxide ($SiO_2$), magnesium fluoride, zirconium phosphate, or a mixture thereof (a thin film of such a dielectric material serves as an insulator for electrons but as a conductor for protons ($H+$) and hydroxy ions ($OH-$)). Exemplary of solid electrolytes useful as the ion conductive layer are sodium chloride, potassium chloride, sodium bromide, potassium bromide, $Na_3Zr_2Si_2PO_{12}$, $Na_{1+x}ZrSi_xP_{3-x}O_{12}$, $Na_5YSi_4O_{12}$, or $RbAg_4I_5$. The ion conductive layer may also be a water or proton source-containing synthetic resin copolymer of $\beta$-hydroxyethyl methacrylate with 2-acrylamide-2-methylpropane sulfonic acid, a hydrate vinyl copolymer (e.g., a hydrate methyl methacrylate copolymer), or a hydrate polyester. The ion conductive layer also can be an electrolytic solution of an acid (e.g., sulphuric acid, hydrochloric acid, phosphoric acid, acetic acid, butyric acid, or oxalic acid) or an aqueous solution thereof, an aqueous solution of an alkali (e.g., sodium hydroxide or lithium hydroxide), or an aqueous solution of a solid strong electrolyte (e.g., sodium hydroxide, lithium chloride, potassium chloride, or lithium sulfide. Exemplary of semi-solid gel electrolytes useful as the ion conductive layer are those, for example, obtained by gelling an electrolYtic aqueous solution with a gelling agent (e.g., polyvinyl alcohol, CMC, agar-agar or gelatin). Preferably, the ion conductive layer is selected from a material which comprised alkali metal compounds. Most preferably, such compounds are selected from nitrate salts and chloride salts of alkali metal compounds. The alkali metal in such compounds are preferably selected from lithium, potassium and sodium.

As would be apparent to those skilled in the art in view of the present disclosure, the method of this invention is applicable to any electrochromic device. Such devices may comprise other components, e.g., counter electrodes, a second electrochromic layer, etc.. Counter electrodes are generally employed between the ion conductive layer and an electrode of the device (i.e., between layers 14 and 18 in the device of FIG. 1) to improve operation of the device. A counter electrode may be formed of, e.g., $WO_3$ doped with and alkali metal ion, and may be deposited by any technique, including pyrolytic deposition. In this case, however, in contrast to the method disclosed herein, the counter electrode material would not be deposited in a reducing environment since this material is generally not meant to be electrochromic.

The following examples are presented by way of description of the invention disclosed herein and set forth the best mode contemplated by the inventor but are not to be construed as limiting.

EXAMPLE 1

In this example, an electrochromic device was made which included a reduced tungsten oxide film, $WO_x$, made according to the method of this invention. One 30.5 cm square side of a glass substrate 0.318 cm thick was provided with a 200 nm thick layer of electrode material comprising $SnO_2$ doped with fluoride, which layer had a resistance of 30 ohms/square. This conductive layer was deposited according to the deposition techniques taught in U. S. Pat. No. 4,721,632. The glass/electrode system allows for transmittance of about 80% of visible light.

The glass/electrode system was heated to a temperature of 1080° F. in a vertical furnace. Upon exiting the furnace to room temperature, a room temperature solution of $WCl_6$ dissolved in N, N-dimethyl formamide was applied to the electrode surface with a Devilbiss model JGV-560 hand held spray gun using air as the carrier (atomization) gas. The solution atomization pressure was 3.52 Kgf/cm² and the distance from the electrode surface to the gun nozzle was approximately 15 cm. The applied electrochromic $WO_x$ film had a thickness of about 110 nm.

A second glass/electrode like that above was made. In order to form an electrochromic device, the glass/electrode system and the glass/electrode/$WO_x$ system of this example were spaced parallel to each other as in FIG. 1. Three corresponding edges of the systems were sealed with a silicon resin to form a cavity between the electrode and the $WO_x$ film. An electrolytic solution comprising 1 molar lithium perchlorate in propylene carbonate was poured in the cavity the form an electrochromic device.

The solar transmission (IR, UV, and visible light transmission) of the device in the "bleached" (uncolored) state was measured by a spectrophotometer. The results are shown in FIG. 2 and Table 1, Item (a). A copper wire was connected to each electrode. A direct biasing voltage of 5 V was applied for 1.5 minutes across the electrodes, with the electrode nearest the $WO_x$ film being of negatively polarity. (The same voltage also was applied for the same length of time, 5 V/1.5 minutes, in the following examples.) Application of this voltage caused the electrochromic material in the device to change from colorless to a blue color (herein called its colored state). The solar transmission of the device in the "colored" state was measured by the spectrophotometer. The results are shown in Table 1, Item (a). It can be seen from these results that there was a substantial change in the solar transmission as well as in the color when the tungsten oxide of the electrochromic device was changed from its bleached to its colored state.

EXAMPLE 2

In this example, an electrochromic device was made which included a reduced tungsten oxide film, $WO_x$, made according to the method of this invention. The device of this example was similar to that of Example 1 except that the $WO_x$ was made as follows. When the heated glass/electrode exited the furnace, 5 grams of $W(CO)_6$ powder was sprayed on the electrode with a Binks model 171, hand held floccing gun. The electrode-to-gun distance was approximately 12.7 cm and powder particle atomization pressure was 3.52 Kgf/cm². The atomization agent was nitrogen gas. A continuous film of about 108 nm was deposited on the electrode.

The solar transmission of the device in the bleached and colored state was measured as in Example 1. The results are shown in table 1(b). It can be seen from these results that a $WO_x$ film deposited from a powdered composition, as compared to that deposited from the solution of Example 1, provided a device capable of desirably exhibiting a greater decrease in solar transmission (i.e., from 58.1 to 25.0 as compared to 58.7 to 38.9, total) and a greater change in contrast (i.e., a greater change in the difference between the visible transmission in the bleached and colored states) when the electrochromic layer was switched from the bleached to the colored state.

EXAMPLE 3

In this example, an electrochromic device was made which included a reduced tungsten oxide film, $WO_x$, made according to the method of this invention. The device was made according to the techniques described in Example 1 except that the deposited $WO_x$ film in this example was thicker, having a thickness of 400 nm, as compared to the 108 nm thickness of the $WO_x$ film of Example 1. In both of these examples, the $WO_x$ film therein was formed by deposition from a solution of $WCl_6$ dissolved in N, N-dimethyl formamide.

The same procedure as in Example 1 was followed to color the electrochromic film and, as in Example 1, solar transmission measurements in the bleached and colored states. Table I(c) list the results. As can be seen from these results, when compared to those of Examples 1 and 2, the deposition of a thicker film from either a solution or a powder provides a device capable of a desirably greater decrease in solar transmission.

EXAMPLE 4

In this example, an electrochromic device was made which included a reduced tungsten oxide film, $WO_x$, made according to the method of this invention. The device was made according to the techniques described in Example 2 except that the deposited $WO_x$ film in this example was thicker, having a thickness of 400 nm, as compared to the 108 nm thickness of the $WO_x$ film of Example 1. In this example as well as in Example 2, the $WO_x$ film was deposited from $W(CO)_6$ powder The same procedure as in Example 2 was followed to color the electrochromic film and, as in Example 2, solar transmission measurements were made in the bleached and colored states. Table I(d) list the results. As can be seen from these results, when compared to those of Example 2, the deposition of a thicker film from the same powder composition provides a device capable of desirably greater decrease in solar transmission and a greater color contrast. When the results of this example are compared to those of Example 3, it can be seen that a film deposited from a powder composition as compared to that deposited from a solution again (as was the case with Examples 1 and 2) provides a device capable of a desirably greater reduction in solar transmission and greater change in the color contrast between the bleached and colored states.

TABLE I

Solar Transmission (%) of Electrochromic Cells Utilizing Pyrolytic Tungsten Oxide Films
(Applied Voltage: 5.UV; Time: 90 secs, $T_d$-1080° F.)

| | | Thickness | Source | UV | Visible | IR | Total |
|---|---|---|---|---|---|---|---|
| a | $WO_x$-bleached | 110 | $WCl_6$ | 42.7 | 68.2 | 52.5 | 58.7 |
|   | $WO_x$-colored  | 110 | $WCl_6$ | 42.9 | 55.6 | 26.5 | 38.9 |
| b | $WO_x$-bleached | 108 | $W(CO)_6$ | 45.6 | 71.7 | 48.5 | 58.1 |
|   | $WO_x$-colored  | 108 | $W(CO)_6$ | 42.7 | 41.6 | 12.0 | 25.0 |
| c | $WO_x$-bleached | 400 | $WCl_6$ | 31.3 | 72.9 | 523  | 60.3 |
|   | $WO_x$-colored  | 400 | $WCl_6$ | 21.9 | 25.8 | 10.2 | 16.9 |
| d | $WO_x$-bleached | 400 | $W(CO)_6$ | 15.2 | 50.8 | 21.9 | 33.7 |
|   | $WO_x$-colored  | 400 | $W(CO)_6$ | 14.4 | 6.5  | 0.0  | 3.0  |

In view of the disclosure, many modifications of this invention will be apparent to those skilled in the art. It is intended that all such modifications which fall within the true scope of this invention be included within the terms of the appended claims.

We claim:

1. An electrochromic device comprising two substrates and therebetween one electrode layer, an electrochromic layer, an ion conductive layer, and another electrode layer in that order, at least one of said one electrode layer and said other electrode layer being transparent and each electrode layer being in contact with one of said substrates, said ion conductive layer comprising ion source means for providing ions into said electrochromic layer upon application of a voltage across said electrode layers, wherein said electrochromic layer comprises a non-stoichiometric, oxygen deficient, variable oxidation state metal oxide deposited by pyrolytic deposition onto a surface selected from a surface of said ion conductive layer and a surface of said electrode layer while said surface is at a temperature between 500° F. and 1200° F. and said metal oxide composition is deposited by pyrolytic deposition of a composition which is selected from a powdered composition comprising a variable oxidation state metal compound and a reducing agent or a liquid composition comprising a variable oxidation state metal compound and a reducing agent.

2. The electrochromic device according to claim 1, wherein said surface is at a temperature between about 700° F. and about 1100° F.

3. The electrochromic device according to claim 1, wherein the metal oxide of said electrochromic layer is selected from tungsten oxide, molybdenum oxide, copper oxide, nickel oxide, cobalt oxide and mixtures of any of them.

4. The electrochromic device according to claim 1, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

5. An electrochromic device according to claim 1, wherein said ion conductive layer is selected from a material comprising alkali metal compounds.

6. An electrochromic device according to claim 5, wherein said alkali metal compounds are selected from compounds comprising nitrates and chlorides of alkali metals.

7. An electrochromic device comprising two substrates and therebetween one electrode layer, an electrochromic layer, an ion conductive layer, and another electrode layer in that order, at least one of said one electrode layer and said other electrode layer being transparent and each electrode layer being in contact with one of said substrates, said ion conductive layer comprising ion source means for providing ions into said electrochromic layer upon application of a voltage across said electrode layers, wherein said electrochromic layer comprises a non-stoichiometric, oxygen deficient, variable oxidation state metal oxide deposited by pyrolytic deposition onto a surface selected from a surface of said ion conductive layer and a surface of said electrode layer while said surface is at a temperature between 500° F. and 1200° F., and said metal oxide is deposited by pyrolytic deposition of a composition selected from a powdered composition comprising a variable oxidation state metal compound and a liquid composition comprising a variable oxidation state metal compound and during the pyrolytic deposition of said electrochromic layer the ambient, near the surface of said one electrode or ion conductive material on which said electrochromic layer is being deposited, comprises an inert gas.

8. A method for forming an electrochromic device comprising two substrates and therebetween one electrode layer, an electrochromic layer, an ion conductive layer, and another electrode layer in that order, at least one of said one electrode layer and said other electrode layer being transparent and each electrode layer being in contact with one of said substrates, said ion conductive layer comprising ion source means for providing ions into said electrochromic layer upon application of a voltage across said electrode layers, said method comprising providing said electrochromic layer comprising a non-stoichiometric, oxygen deficient, variable oxidation state metal oxide deposited by pyrolytic deposition onto a surface selected from a surface of said ion conductive layer and a surface of said electrode layer while said surface is at a temperature between 500° F. and 1200° F. and said metal oxide composition is deposited by pyrolytic deposition of a composition which is selected from a powdered composition comprising a variable oxidation state metal compound and a reducing agent or a liquid composition comprising a variable oxidation state metal compound and a reducing agent.

9. The method for forming an electrochromic device according to claim 8, wherein said surface is at a temperature between about 700° F. and about 1100° F.

10. The method for forming an electrochromic device according to claim 8, wherein the metal oxide of said electrochromic layer is selected from tungsten oxide, molybdenum oxide, copper oxide, nickel oxide, cobalt oxide and mixtures of any of them.

11. The method for forming an electrochromic device according to claim 8 wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

12. The method for forming an electrochromic device according to claim 8, wherein said ion conductive layer is selected from a material comprising alkali metal compounds.

13. The method for forming an electrochromic device according to claim 12, wherein said alkali metal are selected from compounds comprising nitrates and chlorides of alkali metals.

14. A method for forming an electrochromic device comprising two substrates and therebetween one electrode layer, an electrochromic layer, an ion conductive layer, and another electrode layer in that order, at least one of said one electrode layer and said other electrode layer being transparent and each electrode layer being in contact with one of said substrates, said ion conductive layer comprising ion source means for providing ions into said electrochromic layer upon application of a voltage across said electrode layers, said method comprising providing said electrochromic layer comprising a non-stoichiometric, oxygen deficient, variable oxidation state metal oxide deposited by pyrolytic deposition onto a surface selected from a surface of said ion conductive layer and a surface of said electrode layer while said surface is at a temperature between 500° and 1200° F., and said metal oxide is deposited by pyrolytic deposition of a composition selected from a powdered composition comprising a variable oxidation state metal compound and a liquid composition comprising a variable oxidation state metal compound and during the pyrolytic deposition of said electrochromic layer the ambient, near the surface of said one electrode or ion conductive material on which said electrochromic layer is being deposited, comprises an inert gas.

15. An electrochromic device comprising two substrates and therebetween one electrode layer, an electrochromic layer, an ion conductive layer, and another electrode layer in that order, at least one of said one electrode layer and said other electrode layer being transparent and each electrode layer being in contact with one of said substrates, said ion conductive layer comprising ion source means for providing ions into said electrochromic layer upon application of a voltage across said electrode layers, wherein said electrochromic layer comprises a non-stoichiometric, oxygen deficient, variable oxidation state metal oxide deposited by pyrolytic deposition onto a surface selected from a surface of said ion conductive layer and a surface of said electrode layer while said surface is at a temperature between 500° F. and 1200° F., and said metal oxide is deposited by pyrolytic deposition of a composition selected from a powdered composition comprising a variable oxidation state metal compound and a liquid composition comprising a variable oxidation state metal compound and said composition is dispersed in a carrier gas comprising gas selected from an inert gas and a reducing gas.

16. The electrochromic device according to claim 15, wherein the metal oxide of said electrochromic layer is selected from tungsten oxide, molybdenum oxide, copper oxide, nickel oxide, cobalt oxide, and mixtures of any of them.

17. The electrochromic device according to claim 15, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

18. The electrochromic device according to claim 15, wherein said ion conductive layer is selected from a material comprising alkali metal compounds.

19. An electrochromic device according to claim 7, wherein said inert gas is nitrogen.

20. The electrochromic device according to claim 7, wherein the metal oxide of said electrochromic layer is selected from tungsten oxide, molybdenum oxide, copper oxide, nickel oxide, cobalt oxide, and mixtures of any of them.

21. The electrochromic device according to claim 7, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

22. The electrochromic device according to claim 7, wherein said ion conductive layer is selected from a material comprising alkali metal compounds.

23. A method for forming an electrochromic device comprising two substrates and therebetween one electrode layer, an electrochromic layer, an ion conductive layer, and another electrode layer in that order, at least one of said one electrode layer and said other electrode layer being transparent and each electrode layer being in contact with one of said substrates, said ion conductive layer comprising ion source means for providing ions into said electrochromic layer upon application of a voltage across said electrode layers, said method comprising providing said electrochromic layer comprising a non-stoichiometric, oxygen deficient, variable oxidation state metal oxide deposited by pyrolytic deposition onto a surface selected from a surface of said ion conductive layer and a surface of said electrode layer while said surface is at a temperature between 500° F. and 1200° F. and said metal oxide is deposited by pyrolytic deposition of a composition selected from a powdered composition comprising a variable oxidation state metal compound and a liquid composition comprising a variable oxidation state metal compound and said composition is dispersed in a carrier gas comprising gas selected from an inert gas and a reducing gas.

24. The method for forming an electrochromic device according to claim 23, wherein the metal oxide of said electrochromic layer is selected from tungsten oxide, molybdenum oxide, copper oxide, nickel oxide, cobalt oxide, and mixtures of any of them.

25. The method for forming an electrochromic device according to claim 23, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

26. The method for forming an electrochromic device according to claim 23, wherein said ion conductive layer is selected from a material comprising alkali metal compounds.

27. The method for forming an electrochromic device according to claim 14, wherein said inert gas is nitrogen.

28. The method for forming an electrochromic device according to claim 14, wherein the metal oxide of said electrochromic layer is selected from tungsten oxide, molybdenum oxide, copper oxide, nickel oxide, cobalt oxide, and mixtures of any of them.

29. The method for forming an electrochromic device according to claim 14, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

30. The method for forming an electrochromic device according to claim 14, wherein said ion conductive layer is selected from a material comprising alkali metal compounds.

* * * * *